United States Patent
Salter et al.

(10) Patent No.: US 11,884,178 B2
(45) Date of Patent: Jan. 30, 2024

(54) BIDIRECTIONAL CHARGING EVENTS BASED ON PREDICTED AND ACTUAL POWER OUTAGES

(71) Applicant: FORD GLOBAL TECHNOLOGIES, LLC, Dearborn, MI (US)

(72) Inventors: Stuart C. Salter, White Lake, MI (US); Ryan O'Gorman, Beverly Hills, MI (US); Peter Phung, Windsor (CA); Paul Kenneth Dellock, Northville, MI (US); Katherine Howard-Cone, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 440 days.

(21) Appl. No.: 17/331,886

(22) Filed: May 27, 2021

(65) Prior Publication Data

US 2022/0379770 A1  Dec. 1, 2022

(51) Int. Cl.
| | |
|---|---|
| *B60L 55/00* | (2019.01) |
| *B60L 53/66* | (2019.01) |
| *G06Q 50/06* | (2012.01) |
| *H02J 3/00* | (2006.01) |
| *G06Q 10/04* | (2023.01) |
| *H02J 3/32* | (2006.01) |

(52) U.S. Cl.
CPC .............. *B60L 55/00* (2019.02); *B60L 53/66* (2019.02); *G06Q 10/04* (2013.01); *G06Q 50/06* (2013.01); *H02J 3/001* (2020.01); *H02J 3/322* (2020.01)

(58) Field of Classification Search
CPC ......... B60L 55/00; B60L 53/66; G06Q 50/06; H02J 3/001; H02J 3/322
See application file for complete search history.

(56) References Cited

U.S. PATENT DOCUMENTS

| | | | |
|---|---|---|---|
| 8,278,881 B2 | 10/2012 | Woody et al. | |
| 8,798,830 B2 | 8/2014 | Sobue et al. | |
| 9,024,744 B2 | 5/2015 | Klose et al. | |
| 9,401,610 B2* | 7/2016 | Uyeki | B60L 53/64 |
| 10,906,425 B2* | 2/2021 | Herman | B60L 53/68 |
| 11,524,601 B2* | 12/2022 | Yu | B60L 58/13 |
| 2016/0221455 A1 | 8/2016 | Ando et al. | |
| 2023/0043446 A1* | 2/2023 | Salter | B60L 53/68 |

FOREIGN PATENT DOCUMENTS

| | | | |
|---|---|---|---|
| JP | 2018121439 A | * | 8/2018 |
| JP | 2020114051 A | | 7/2020 |

* cited by examiner

*Primary Examiner* — Richard V Muralidar
(74) *Attorney, Agent, or Firm* — David B. Kelley; Carlson, Gaskey & Olds, P.C.

(57) ABSTRACT

Systems and methods may coordinate and execute bidirectional energy transfer events between electrified vehicles and other devices or structures. Weather related data and/or grid related data may be leveraged for predicting the likelihood of power outage conditions of a grid power source. When power outage conditions are likely, a charging storage limit of a traction battery pack of the electrified vehicle may be automatically increased. The increased charging storage limit temporarily increases the energy storage capacity of the traction battery pack in anticipation of expected power outage conditions, thereby better preparing the traction battery pack for use as a backup power source during the power outage conditions.

20 Claims, 5 Drawing Sheets

BIDIRECTIONAL CHARGING EVENTS BASED ON PREDICTED AND ACTUAL POWER OUTAGES

TECHNICAL FIELD

This disclosure is directed to systems and methods for coordinating and achieving bidirectional energy transfers between vehicles and other devices or structures based, at least in part, on predicted and actual power outage conditions.

BACKGROUND

Electrified vehicles differ from conventional motor vehicles because they are selectively driven by one or more traction battery pack powered electric machines. The electric machines can propel the electrified vehicles instead of, or in combination with, an internal combustion engine. Plug-in type electrified vehicles include one or more charging interfaces for charging the traction battery pack. Plug-in type electrified vehicles are typically charged while parked at a charging station or some other utility power source. Charging electrified vehicles can become challenging, if possible at all, during electrical power outage conditions.

SUMMARY

A bidirectional energy transfer system according to an exemplary aspect of the present disclosure includes, among other things, a traction battery pack and a control module programmed to automatically increase a charging storage limit of the traction battery pack in response to predicting that a power outage condition of a grid power source is likely.

In a further non-limiting embodiment of the foregoing system, the control module is programmed to predict that the power outage condition is likely based on weather related data received from a weather data server.

In a further non-limiting embodiment of either of the foregoing systems, the control module is programmed to predict that the power outage condition is likely based on data received from a grid announcement server associated with the grid power source.

In a further non-limiting embodiment of any of the foregoing systems, the control module is a component of an electrified vehicle that is powered by the traction battery pack.

In a further non-limiting embodiment of any of the foregoing systems, the control module is a component of a cloud-based storage system.

In a further non-limiting embodiment of any of the foregoing systems, the control module is programmed to increase the charging storage limit of the traction battery pack from 80% to 100% in response to predicting that the power outage condition is likely.

In a further non-limiting embodiment of any of the foregoing systems, the charging storage limit is part of a smart bidirectional charging schedule that is created by the control module in response to predicting that the power outage condition is likely.

In a further non-limiting embodiment of any of the foregoing systems, the control module is programmed to control a transfer of energy between the traction battery pack and a structure.

In a further non-limiting embodiment of any of the foregoing systems, the smart bidirectional charging schedule includes instructions for transferring power from the traction battery pack to the structure for powering an AC infrastructure of the structure in response to detecting an actual power outage condition.

In a further non-limiting embodiment of any of the foregoing systems, the control module is further programmed to notify a user in response to predicting that the power outage condition is likely and provide a list of available charging options for charging the traction battery pack or provide turn-by-turn instructions for guiding the user back to a home location.

A method according to another exemplary aspect of the present disclosure includes, among other things, automatically adjusting, via a control module of a bidirectional energy transfer system, a charging storage limit of a traction battery pack of an electrified vehicle when a power outage condition of a grid power source is predicted as being likely.

In a further non-limiting embodiment of the forgoing method, automatically adjusting the charging storage limit includes increasing the charging storage limit of the traction battery pack from 80% to 100%.

In a further non-limiting embodiment of either of the foregoing methods, the control module is a component of the electrified vehicle.

In a further non-limiting embodiment of any of the foregoing methods, the control module is a component of a cloud-based server system.

In a further non-limiting embodiment of any of the foregoing methods, the method includes receiving weather related data from a weather data server, and predicting whether or not the power outage condition is likely based on the weather related data.

In a further non-limiting embodiment of any of the foregoing methods, the method includes receiving data from a grid announcement server associated with the grid power source, and predicting whether or not the power outage condition is likely based on the data from the grid announcement server.

In a further non-limiting embodiment of any of the foregoing methods, the method includes determining whether the electrified vehicle is at a home location, determining whether the electrified vehicle is on-plug, determining whether an actual power outage is occurring, and delivering power from the traction battery pack to the home location when 1) the electrified vehicle is at the home location; 2) the electrified vehicle is on-plug; and 3) the actual power outage condition is occurring.

In a further non-limiting embodiment of any of the foregoing methods, the method includes determining whether the electrified vehicle is at a home location, determining whether the electrified vehicle is on-plug, and charging the traction battery pack to the charging storage limit when the electrified vehicle is at the home location and is on-plug.

In a further non-limiting embodiment of any of the foregoing methods, the method includes notifying a user that the electrified vehicle is located in a power outage zone when the electrified vehicle is not at the home location, and providing the user with a list of available charging options for charging the traction battery pack.

In a further non-limiting embodiment of any of the foregoing methods, the method includes notifying a user that the power outage condition is likely while the electrified vehicle is away from the home location, and providing the user with turn-by-turn instructions for returning to the home location.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to systems and methods for coordinating and executing bidirectional energy transfer events between electrified vehicles and other devices or structures. Weather related data and/or grid related data may be leveraged for predicting the likelihood of power outage conditions of a grid power source. When power outage conditions are likely, a charging storage limit of a traction battery pack of the electrified vehicle may be automatically increased. The increased charging storage limit temporarily increases the energy storage capacity of the traction battery pack in anticipation of expected power outage conditions, thereby better preparing the traction battery pack for use as a backup power source during the power outage conditions. These and other features of this disclosure are discussed in greater detail in the following paragraphs of this detailed description.

Figure 1:
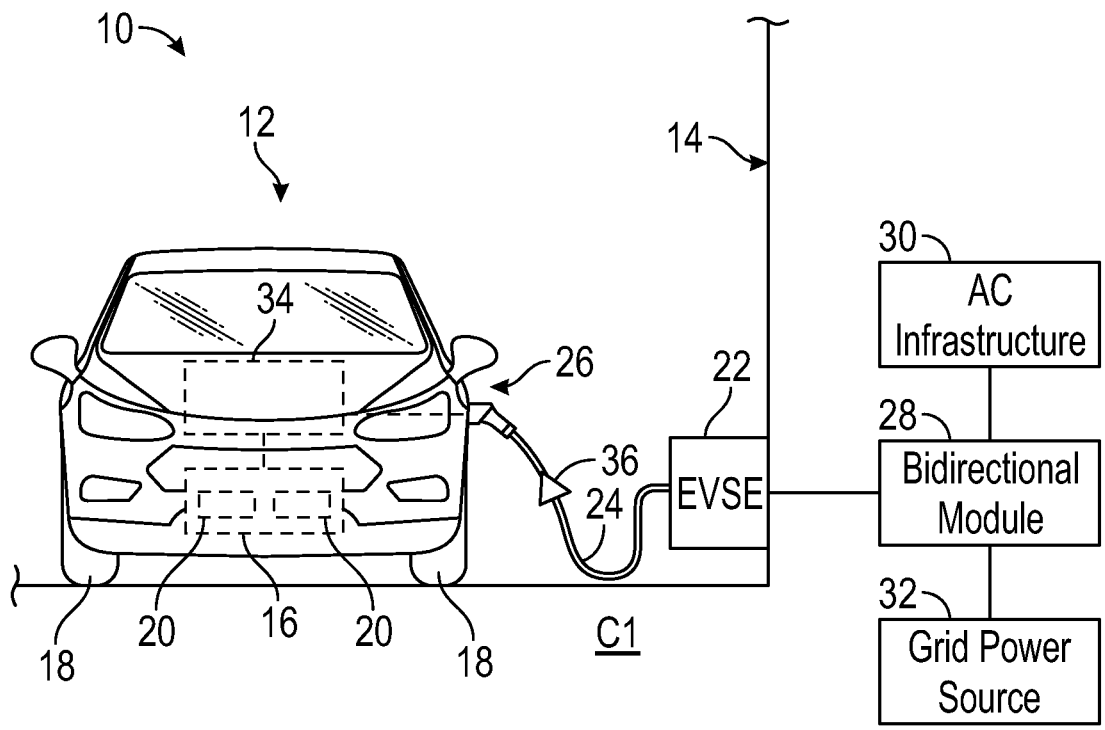
FIG. 1 schematically illustrates a first configuration of a bidirectional energy transfer system.
Figure 2:
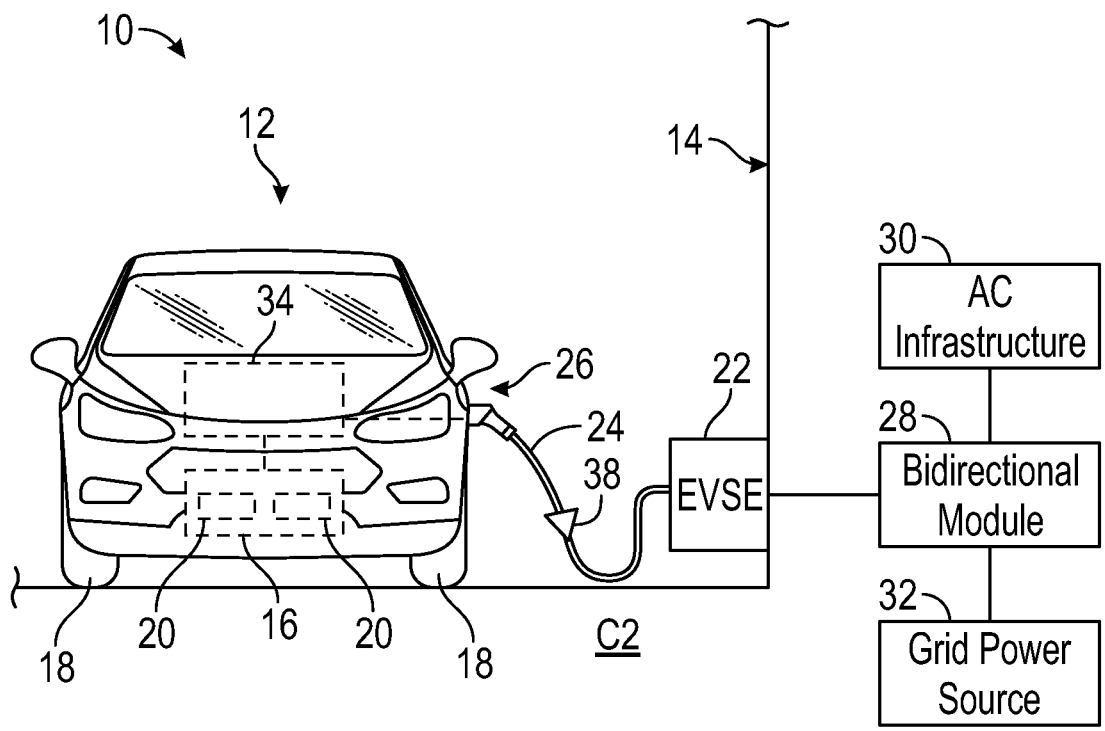
FIG. 2 schematically illustrates a second configuration of the bidirectional energy transfer system of FIG. 1.

FIGS. 1 and 2 schematically illustrate an exemplary bidirectional energy transfer system 10 (hereinafter "the system 10") for bidirectionally transferring energy between an electrified vehicle 12 and a structure 14. The system 10 enables the bidirectional transfer of energy from the electrified vehicle 12 to the structure 14 or vice versa. The structure 14 may be a residential building, a commercial building, a parking garage, a charging station, or any other type of structure that is capable of receiving or transferring energy. In an embodiment, the structure 14 is a garage of a residential home that functions as a "home location" of the electrified vehicle 12.

Although a specific component relationship is illustrated in the figures of this disclosure, the illustrations are not intended to limit this disclosure. The placement and orientation of the various components of the depicted vehicles are shown schematically and could vary within the scope of this disclosure. In addition, the various figures accompanying this disclosure are not necessarily drawn to scale, and some features may be exaggerated or minimized to emphasize certain details of a particular component.

In an embodiment, the electrified vehicle 12 is a plug-in type electrified vehicle (e.g., a plug-in hybrid electric vehicle (PHEV) or a battery electric vehicles (BEV)). The electrified vehicle 12 includes a traction battery pack 16. The electrified vehicle 12 may include an electrified powertrain capable of applying a torque from an electric machine (e.g., an electric motor) for driving drive wheels 18 of the electrified vehicle 12. Therefore, the powertrain of the electrified vehicle 12 may electrically propel the set of drive wheels 18 either with or without the assistance of an internal combustion engine.

The electrified vehicle 12 of FIG. 1 is schematically illustrated as a car. However, other vehicle configurations are also contemplated. The teachings of this disclosure may be applicable for any type of vehicle as the electrified vehicle 12. For example, the electrified vehicle 12 could be configured as a car, a truck, a van, a sport utility vehicle (SUV), etc.

Although shown schematically, the traction battery pack 16 may be configured as a high voltage traction battery pack that includes a plurality of battery arrays 20 (i.e., battery assemblies or groupings of battery cells) capable of outputting electrical power to one or more electric machines of the electrified vehicle. Other types of energy storage devices and/or output devices may also be used to electrically power the electrified vehicle 12.

The electrified vehicle 12 may interface with the structure 14 through an electric vehicle supply equipment (EVSE) 22 in order to perform bidirectional energy transfers of the system 10. A charge cable 24 may operably connect the EVSE 22 to a charge port assembly 26 of the electrified vehicle 12 for transferring energy between the electrified vehicle 12 and the structure 14. The charge cable 24 may be configured to provide any level of charging (e.g., Level 1 AC charging, Level 2 AC charging, DC charging, etc.).

The EVSE 22 may be operably connected to an AC infrastructure 30 of the structure 14 through a bidirectional energy transfer module 28. Although shown separately from the EVSE 22 in FIG. 1, the bidirectional energy transfer module 28 and the EVSE 22 could be integrated together as part of common module. Various electrical loads, such as common household loads, for example, may be associated with the AC infrastructure 30.

Power from a grid power source 32 (e.g., AC power, solar power, wind power, or combinations thereof) and/or power from the electrified vehicle 12 may be communicated to the bidirectional energy transfer module 28. The bidirectional energy transfer module 28 is configured to aid the establishment of bidirectional transfers of electrical energy between the electrified vehicle 12 and the structure 14. The bidirectional energy transfer module 28 may include various equipment, including but not limited to an AC/DC converter, a common HVDC bus, an isolation transformer, a DC/DC converter, a control module, etc. for configuring the structure 14 to either receive electrical energy from the electrified vehicle 12 or send electrical energy to the electrified vehicle 12. The bidirectional energy transfer module 28 may further be configured to transfer energy from the grid power source 32 to the AC infrastructure 30.

The electrified vehicle 12 may include a bidirectional power transfer system 34 configured for further enabling the bidirectional transfer of power between the electrified vehicle 12 and the structure 14. The bidirectional power transfer system 34 may be operably connected between the charge port assembly 26 and the traction battery pack 16 of the electrified vehicle 12. The bidirectional power transfer system 34 may include various equipment, such as a charger, a converter, a motor controller (which may be referred to as an inverter system controller or ISC), etc. for configuring the electrified vehicle 12 for either receiving electrical energy from the structure 14 or communicating electrical energy to the structure 14. The bidirectional power transfer systems 34 may additionally be configured to transfer energy between the traction battery packs 16 and the electric motors of each respective vehicle.

One non-limiting example of a suitable bidirectional power transfer system that may be employed for use within the electrified vehicle 12 for achieving bidirectional power transfers is disclosed within US Patent Publication No. 2020/0324665, assigned to Ford Global Technologies, LLC, the disclosure of which is herein incorporated by reference. However, other bidirectional power transfer systems could also be utilized for achieving the bidirectional transfer of power within the scope of this disclosure.

FIG. 1 schematically illustrates a first configuration C1 of the system 10. During the first configuration C1, power may be transferred from the structure 14 to the electrified vehicle 12, such as for charging the traction battery pack 16 of the electrified vehicle 12. The direction of energy transfer during the first configuration C1 is schematically depicted by arrow 36.

FIG. 2 schematically illustrates a second configuration C2 of the system 10. During the second configuration C2, power may be transferred from the traction battery pack 16 of the electrified vehicle 12 to the structure 14. The direction of energy transfer during the second configuration C2 is schematically illustrated by arrow 38. In this way, the electrified vehicle 12 may be employed as a backup energy storage system for powering electrical loads of the structure 14 when power from the grid power source 32 is temporarily unavailable, such as during electrical blackouts, for example.

Figure 3:
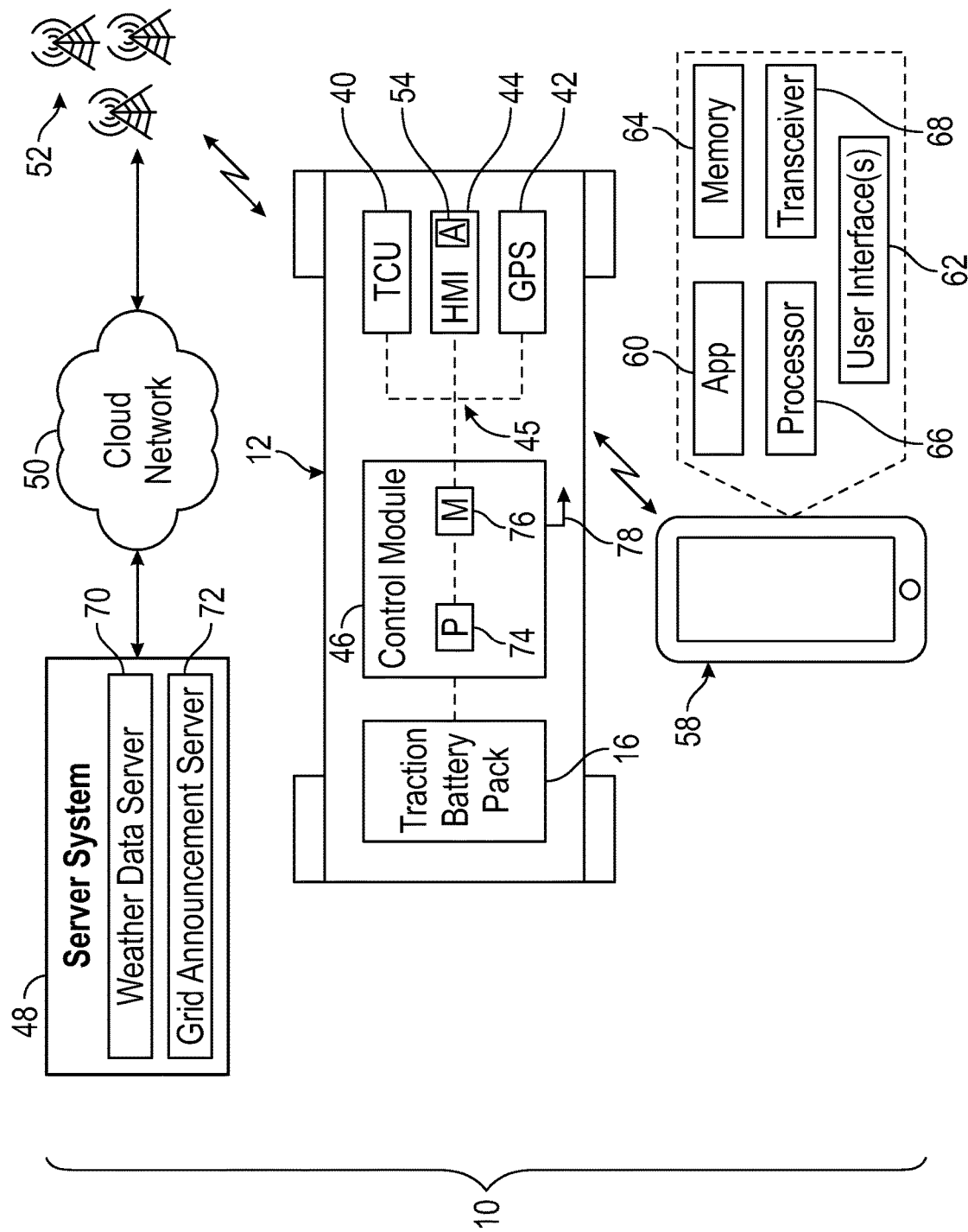
FIG. 3 schematically illustrates exemplary aspects of a bidirectional energy transfer system.

Additional aspects of the system 10 of FIGS. 1-2 are further detailed from the perspective of the electrified vehicle 12 in FIG. 3. In particular, FIG. 3 schematically illustrates features that enable the system 10 to coordinate bidirectional charging events between the electrified vehicle 12 and other devices or structures (e.g., the structure 14) based, at least in part, on predicted and actual power outage conditions.

As further part of the system 10, the electrified vehicle 12 may include a telecommunications module 40, a global positioning system (GPS) 42, a human machine interface (HMI) 44, and a control module 46. These and other components may be interconnected and in electronic communication with one another over a communication bus 45 of the electrified vehicle 12. The communication bus 45 may be a wired communication bus such as a controller area network (CAN) bus, or a wireless communication bus such as Wi-Fi, Bluetooth®, Ultra-Wide Band (UWB), etc.

The telecommunications module 40 may be configured for achieving bidirectional communications with a cloud-based server system 48. The telecommunications module 40 may communicate over a cloud network 50 (e.g., the internet) to obtain various information stored on the server system 48 or to provide information to the server system 48 that can subsequently be accessed by the electrified vehicle 12 (and/or other participating vehicles or structures of the system 10). The server system 48 can identify, collect, and store user data associated with the electrified vehicle 12 for validation purposes. Upon an authorized request, data may be subsequently transmitted to the telecommunications module 40 via one or more cellular towers 52 or some other known communication technique (e.g., Wi-Fi, Bluetooth®, data connectivity, etc.). The telecommunications module 40 can receive data from the server system 48 or can communicate data back to the server system 48 via the cellular tower(s) 52. Although not necessarily shown or described in this highly schematic embodiment, numerous other components may enable bidirectional communications between the electrified vehicle 12 and the server system 48.

The server system 48 may include various servers that store data that may be accessed by the system 10. In an embodiment, the server system 48 includes a weather data server 70 that stores weather related data. The weather related data may include, but is not limited to, weather history, current and forecasted windspeeds, current and forecasted rain fall, current and forecasted temperatures, current and forecasted barometric pressures, presence and/or likelihood of extreme weather (e.g., heat waves, tornados, hurricanes, heavy snow fall/blizzards, wild fires, torrential rain falls, etc.) for any given location. The weather data server 70 may be operated or managed, for example, by an organization such as the national weather service, or could include weather/climate related data collected from weather stations, news stations, remote connected temperature sensors, connected mobile device database tables, etc.

In another embodiment, the server system 48 includes a grid announcement server 72. The grid announcement server 72 may store data related to the grid power source 32. For example, the grid-related data could include announcements concerning scheduled blackouts and/or other grid-related announcements. The grid announcement server 72 may be operated or managed by the utility service provider associated with the grid power source 32 at the location of the electrified vehicle 12 and/or the structure 14.

In a first embodiment, a user/owner of the electrified vehicle 14 may interface with the server system 48 using the HMI 44. For example, the HMI 44 may be equipped with an application 54 (e.g., FordPass™ or another similar web-based application) for interfacing with the server system 48. The HMI 44 may be located within a passenger cabin of the electrified vehicle 12 and may include various user interfaces for displaying information to the vehicle occupants and for allowing the vehicle occupants to enter information into the HMI 44. The vehicle occupants may interact with the user interfaces presentable on the HMI 44 via touch screens, tactile buttons, audible speech, speech synthesis, etc.

In another embodiment, the user/owner of the electrified vehicle 12 could alternatively or additionally interface with the server system 48 for coordinating bidirectional charging events using a personal electronic device 58 (e.g., a smart phone, tablet, computer, wearable smart device, etc.). The personal electronic device 58 may include an application 60 (e.g., FordPass™ or another similar application) that includes programming to allow the user to employ one or more user interfaces 62 for setting or controlling certain aspects of the system 10. The application 60 may be stored in a memory 64 of the personal electronic device 58 and may be executed by a processor 66 of the personal electronic device 58. The personal electronic device 58 may additionally include a transceiver 68 that is configured to communicate with the server system 48 over the cellular tower(s) 52 or some other wireless link.

The GPS 42 is configured to pinpoint locational coordinates of the electrified vehicle 12. The GPS 42 may utilize geopositioning techniques or any other satellite navigation techniques for estimating the geographic position of the electrified vehicle 12 at any point in time.

The control module 46 may include both hardware and software and could be part of an overall vehicle control system, such as a vehicle system controller (VSC), or could alternatively be a stand-alone controller separate from the VSC. In an embodiment, the control module 46 is programmed with executable instructions for interfacing with and commanding operation of various components of the system 10. Although shown as separate modules within the highly schematic depiction of FIG. 3, the telecommunications module 40, the GPS 42, the HMI 44, and the control module 46 could be integrated together as part of common module of the electrified vehicle 12.

The control module 46 may include a processor 74 and non-transitory memory 76 for executing various control strategies and modes associated with the system 10. The processor 74 can be a custom made or commercially available processor, a central processing unit (CPU), or generally any device for executing software instructions. The memory 76 can include any one or combination of volatile memory elements and/or nonvolatile memory elements.

The processor 74 may be operably coupled to the memory 76 and may be configured to execute one or more programs stored in the memory 76 of the control module 46 based on the various inputs received from other devices, such as the server system 48, the telecommunications module 40, the GPS 42, the HMI 44, the traction battery pack 16, etc. In an embodiment, the application 54 (e.g., FordPass™ or another similar application), which includes programming for allowing the vehicle user to employ one or more user interfaces within the HMI 44 for setting or controlling certain aspects of the system 10, may be stored in the memory 76 and may be executed by the processor 74 of the control module 46. Alternatively, the control module 46 may be configured to communicate and interface with the personal electronic device 58 for coordinating and/or executing certain aspects of the system 10.

The control module 46 may receive and process various inputs for predicting a potential power outage condition, detecting an actual power outage condition, and creating a smart bidirectional charging schedule 78 in response to the potential or actual power outage conditions. The smart bidirectional charging schedule 78 may include, among other information, notifications and charging protocols, instructions for either charging the traction battery pack 16 of the electrified vehicle 12, instructions for utilizing the traction battery pack 16 of the electrified vehicle 12 as a backup power source for powering the structure 14, etc.

In an embodiment, based at least on inputs from the weather data server 70, the control module 46 may predict the potential for a power outage condition. Predicting the potential for the power outage condition may include assessing the likelihood of occurrence of a power outage associated with the grid power source 32. The control module 46 may be programmed to predict the potential for the power outage condition based on the likelihood of severe weather at the location of the electrified vehicle 12 and/or the structure 14, how soon the severe weather is predicted to arrive, and/or various other information from the weather data server 70. The prediction may further be based on historical weather logs, storm category information, etc.

The control module 46 may additionally predict the potential for the power outage condition based on inputs from the grid announcement server 72. For example, the control module 46 may be programmed to infer the power outage condition based on scheduled blackout information received from the grid announcement server 72. The control module 46 may be further programmed to detect when an actual power outage condition occurs based on inputs from the grid announcement server 72.

Once a power outage condition is predicted or an actual power outage condition is detected, the control module 46 may receive various additional inputs that may be utilized for creating the smart bidirectional charging schedule 78. One such input to the control module 46 may include location data of the electrified vehicle 12 received from the GPS 42. Another input to the control module 46 may include a plug connection status signal from the charge port assembly 26 for indicating whether or not the electrified vehicle 12 is "on-plug" (e.g., whether or not the charge cable 24 is currently plugged into the charge port assembly 26).

Another input to the control module 46 may include a current state of charge (SOC) level of the traction battery pack 16. Another input to the control module 46 may include information concerning power availability at the structure 14 received from the grid announcement server 72. Yet another input to the control module 46 may include distances to nearby charging stations (e.g., distances between present vehicle coordinates and/or home coordinates to charging locations that are not located within the power outage zone) and/or distances and arrival times to frequently used destinations (e.g., home, school, work, etc.). The control module 46 may be configured to automatically command that the smart bidirectional charging schedule 78 be executed when an actual power outage condition is detected.

In an embodiment, when the power outage condition is predicted as being likely and the electrified vehicle 12 is currently "on-plug," the control module 46 may command an increase of a charging storage limit associated with the traction battery pack 16 as part of the smart bidirectional charging schedule 78. For example, the charging storage limit of the traction battery pack 16 may be temporarily raised from 80% to 100% to allow for a greater amount of energy to be stored in the battery pack 16 in anticipation of an expected power outage condition.

In another embodiment, when the power outage condition is predicted as being likely and the electrified vehicle 12 is currently "off-plug," the control module 46 may command that one or more prompts/instructions be communicated to the user/owner of the electrified vehicle 12 as part of the smart bidirectional charging schedule 78. The prompts/instructions may be displayed as one or more messages on the HMI 44 or the personal electronic device 58, for example, and may include instructions for immediately plugging the charge cable 24 to the charge port assembly 26, instructions for traveling to nearby charging stations before the inclement weather arrives, etc. The control module 46 may consider, among other things, the power required to travel to the home location versus charging at the nearest charging location that is outside of the power outage zone, the amount of time required for traveling to the home location and charging versus charging at the current location, and the vehicle user's typical schedule and traffic conditions (e.g., can user leave for home early and still charge upon arrival?) when preparing the smart bidirectional charging schedule 78.

In yet another embodiment, when the power outage condition is already in effect at either the location of the electrified vehicle 12 or the structure 14, the control module 46 may command that one or more additional prompts/instructions be communicated to the user of the electrified vehicle 12 as part of the smart bidirectional charging schedule 78. The additional prompts/instructions may be displayed as a message on the HMI 44 or the personal electronic device 58, for example, and may include instructions for immediately plugging the charge cable 24 to the charge port assembly 26 for enabling the electrified vehicle 12 to act as a backup power source for powering the structure 14.

In an embodiment, the control module 46 may be programmed to automatically execute the smart bidirectional charging schedule 78 when a power outage condition is predicted as being likely. In another embodiment, the control module 46 may be programmed to automatically execute the smart bidirectional charging schedule 78 when an actual power outage condition occurs.

In yet another embodiment, the control module 46 may interface with and control the functionality of the bidirectional power transfer system 34 and the bidirectional energy transfer module 28 for coordinating and commanding either the first configuration C1 or the second configuration C2 during the bidirectional charging event.

Figure 4:
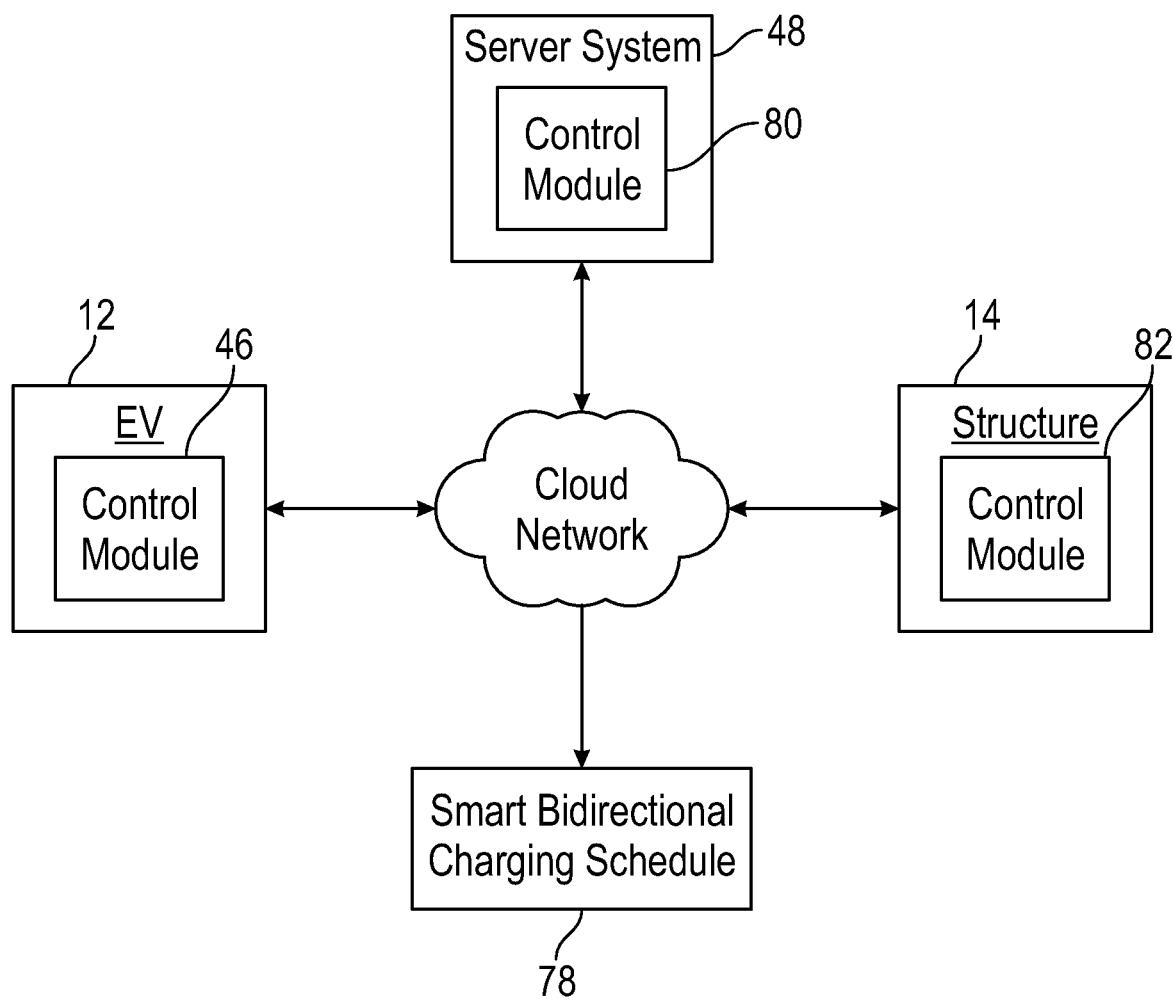
FIG. 4 schematically illustrates another exemplary bidirectional energy transfer system.

In the embodiments described above, the control module 46 of the electrified vehicle 12 may be configured to function as the communications hub of the system 10. However, other embodiments are also contemplated within the scope of this disclosure. For example, as shown in FIG. 4, a control module 80 of the server system 48 (e.g., a cloud-based control module) and/or a control module 82 associated with the structure 14 could be configured to function as the communications hub of the system 10. In yet another embodiment, the respective control modules of each of the electrified vehicle 12, the structure 14, and the server system 48 may operate together over the cloud network 50 to establish a control system for controlling the functionality of the system 10, such as for creating and executing the smart bidirectional charging schedule 78, for example.

Figure 5:
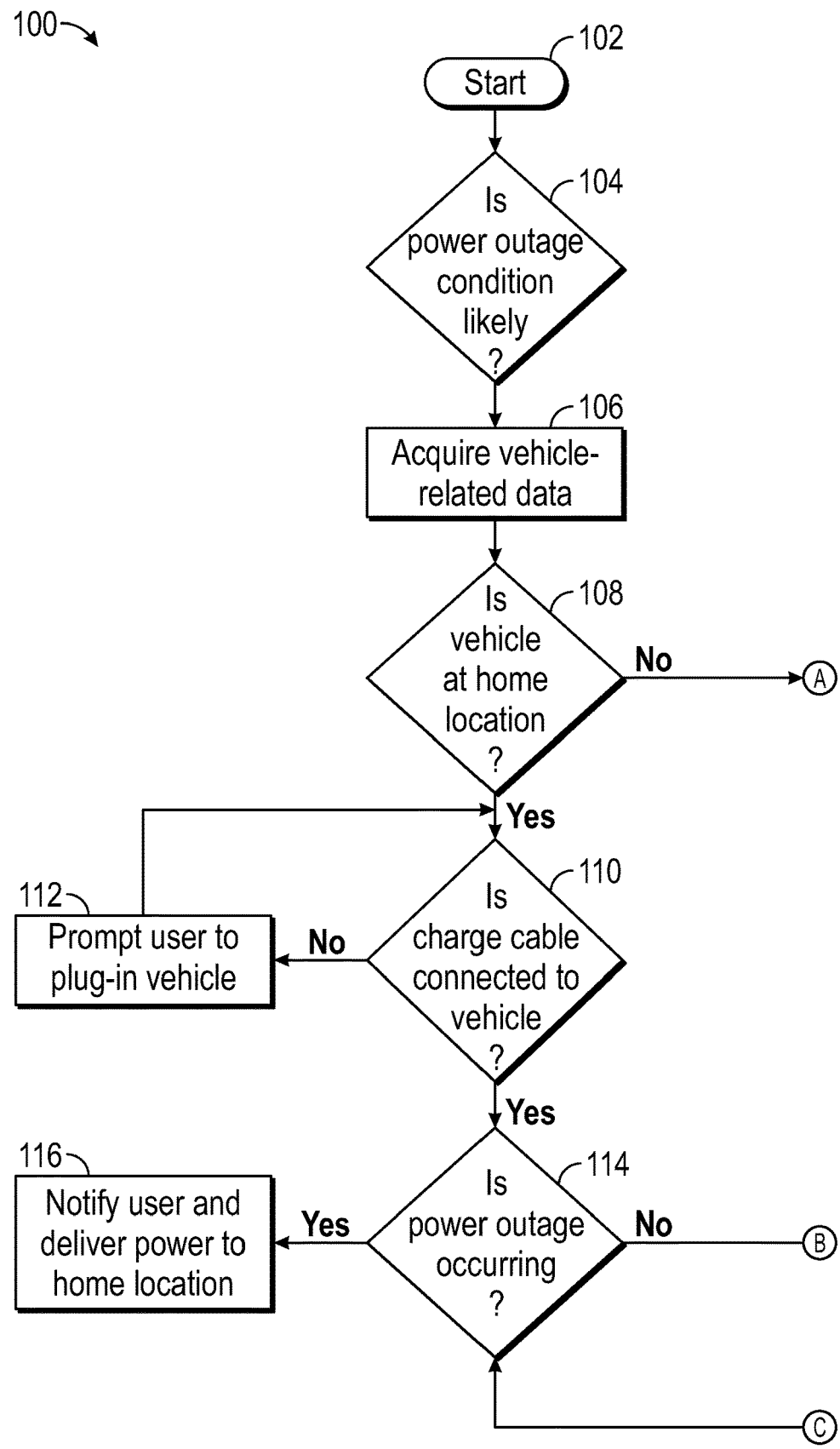
FIG. 5 is a flow chart of an exemplary method for coordinating and achieving bidirectional energy transfer events in response to predicted and actual power outage conditions.
Figure 5:
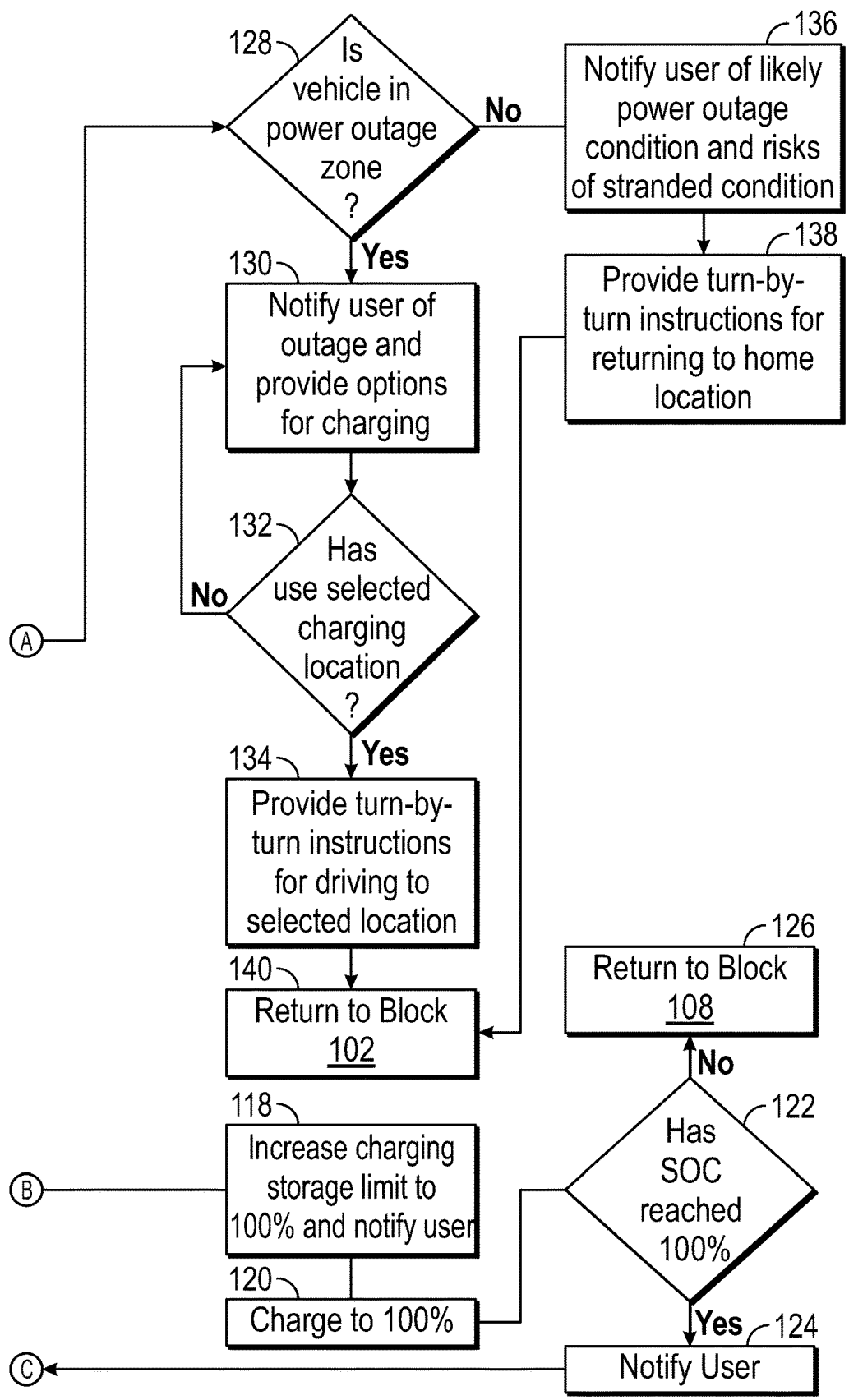

FIG. 5, with continued reference to FIGS. 1-4, schematically illustrates in flow chart form an exemplary method 100 for coordinating and executing bidirectional energy transfer events, such as between the electrified vehicle 12 and the structure 14 and/or other devices or structures. The system 10 may be configured to employ one or more algorithms adapted to execute at least a portion of the steps of the exemplary method 100. For example, the method 100 may be stored as executable instructions in the memory 76 of the control module 46, and the executable instructions may be embodied within any computer readable medium that can be executed by the processor 74 of the control module 46. The method 100 could alternatively or additionally be stored as executable instructions in the memories of the control module 80 of the server system 48 and/or the control module 82.

The exemplary method 100 may begin at block 102. At block 104, the method 100 may determine whether a power outage condition is likely. If YES, the method 100 may proceed to block 106 by acquiring vehicle-related data necessary for creating the smart bidirectional charging schedule 78. The vehicle-related data may include data such as the SOC level of the traction battery pack 16, current location of the electrified vehicle 12, distances and arrival times to nearby charging stations, distances and arrival times to frequently used destinations, etc.

The method 100 may determine whether the electrified vehicle 12 is at its home location at block 108. In this embodiment, the home location of the electrified vehicle 12 is assumed to be the structure 14. However, other embodiments are also contemplated within the scope of this disclosure.

If a YES flag is returned at block 108, the method 100 may proceed to block 110 by determining whether or not the charge cable 24 is currently connected to the charge port assembly 26 of the electrified vehicle 12. If NO, the user of the electrified vehicle 12 may be prompted to plug-in the electrified vehicle 12 at block 112. Alternatively, if a YES flag is returned at block 110, the method 100 may proceed to block 114 by confirming whether an actual power outage is currently occurring. If the actual power outage is detected, the user of the electrified vehicle 12 is notified and power may be supplied from the electrified vehicle 12 to the structure 14, such as for powering the AC infrastructure 30, at block 116.

However, if an actual power outage is not determined to be occurring at block 114, the method 100 may increase the charging storage limit of the traction battery pack 16 to 100% at block 118. The electrified vehicle 12 may then be charged to 100% at block 120.

The method 100 may next determine whether the current SOC of the traction battery pack 16 has reached a level of 100% at block 122. If YES, the user is notified of this fact at block 124, and if NO, the method 100 may return to block 108 as schematically shown at block 126.

The method 100 may alternatively proceed to block 128 when a NO flag is returned at block 108, thus indicating the vehicle is not at the home location. At block 128, the method 100 determines whether the electrified vehicle 12 is currently located within a power outage zone. If YES, the method 100 may notify the user of the outage and provide a list of available charging location options at block 130. The list of charging locations options may include available charging location options that are located outside of the power outage zone but within the available travel range of the electrified vehicle 12, for example.

Next, at block 132, the method 100 may determine whether the user has selected any of the available charging location options. If so, turn-by-turn instructions for driving to the selected location may be displayed to the user, such as on the HMI 44 and/or the personal electronic device 58, at block 134.

The method 100 may alternatively proceed to block 136 when a NO flag is returned at block 128. At block 136, the method 100 may notify the user of an imminent power outage condition and assess the likelihood of a stranded condition of the electrified vehicle 12 if the electrified vehicle 12 were to attempt to return to the structure 14 from its current location. The method 100 may then provide turn-by-turn instructions for returning to the structure 14 at block 138. As schematically shown at block 140, the method 100 may return to block 102 from either block 134 or block 138.

The bidirectional energy transfer systems of this disclosure are designed to coordinate bidirectional charging events between participants based on predicted power outage conditions. The proposed systems facilitate the seamless integration of charging without any necessary manual inputs for supporting a 100% charging threshold limit in anticipation of power outage conditions. The proposed systems may further promote goodwill and comradery between electrified vehicle owners.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A bidirectional energy transfer system, comprising:
a traction battery pack; and
a control module programmed to automatically increase a charging storage limit of the traction battery pack in response to predicting that a power outage condition of a grid power source is likely.

2. The system as recited in claim 1, wherein the control module is programmed to predict that the power outage condition is likely based on weather related data received from a weather data server.

3. The system as recited in claim 1, wherein the control module is programmed to predict that the power outage condition is likely based on data received from a grid announcement server associated with the grid power source.

4. The system as recited in claim 1, wherein the control module is a component of an electrified vehicle that is powered by the traction battery pack.

5. The system as recited in claim 1, wherein the control module is a component of a cloud-based storage system.

6. The system as recited in claim 1, wherein the control module is programmed to increase the charging storage limit of the traction battery pack from 80% to 100% in response to predicting that the power outage condition is likely.

7. The system as recited in claim 1, wherein the charging storage limit is part of a smart bidirectional charging schedule that is created by the control module in response to predicting that the power outage condition is likely.

8. The system as recited in claim 7, wherein the control module is programmed to control a transfer of energy between the traction battery pack and a structure.

9. The system as recited in claim 8, wherein the smart bidirectional charging schedule includes instructions for transferring power from the traction battery pack to the structure for powering an AC infrastructure of the structure in response to detecting an actual power outage condition.

10. The system as recited in claim 1, wherein the control module is further programmed to:
notify a user in response to predicting that the power outage condition is likely; and
provide a list of available charging options for charging the traction battery pack or provide turn-by-turn instructions for guiding the user back to a home location.

11. A method, comprising:
automatically adjusting, via a control module of a bidirectional energy transfer system, a charging storage limit of a traction battery pack of an electrified vehicle when a power outage condition of a grid power source is predicted as being likely.

12. The method as recited in claim 11, wherein automatically adjusting the charging storage limit includes:
increasing the charging storage limit of the traction battery pack from 80% to 100%.

13. The method as recited in claim 11, wherein the control module is a component of the electrified vehicle.

14. The method as recited in claim 11, wherein the control module is a component of a cloud-based server system.

15. The method as recited in claim 11, comprising:
receiving weather related data from a weather data server; and
predicting whether or not the power outage condition is likely based on the weather related data.

16. The method as recited in claim 11, comprising:
receiving data from a grid announcement server associated with the grid power source; and
predicting whether or not the power outage condition is likely based on the data from the grid announcement server.

17. The method as recited in claim 11, comprising:
determining whether the electrified vehicle is at a home location;
determining whether the electrified vehicle is on-plug;
determining whether an actual power outage is occurring; and
delivering power from the traction battery pack to the home location when 1) the electrified vehicle is at the home location; 2) the electrified vehicle is on-plug; and 3) the actual power outage condition is occurring.

18. The method as recited in claim 11, comprising:
determining whether the electrified vehicle is at a home location;
determining whether the electrified vehicle is on-plug;
charging the traction battery pack to the charging storage limit when the electrified vehicle is at the home location and is on-plug.

19. The method as recited in claim 18, comprising:
notifying a user that the electrified vehicle is located in a power outage zone when the electrified vehicle is not at the home location; and
providing the user with a list of available charging options for charging the traction battery pack.

20. The method as recited in claim 18, comprising:
notifying a user that the power outage condition is likely while the electrified vehicle is away from the home location; and
providing the user with turn-by-turn instructions for returning to the home location.

* * * * *